United States Patent [19]

Romanak et al.

[11] Patent Number: 4,861,264

[45] Date of Patent: Aug. 29, 1989

[54] GAS COLLECTOR ELECTRODE ASSEMBLY FOR GAS BURNERS

[75] Inventors: Alfred J. Romanak, Broadview Heights; Russell W. Moss, Richmond Heights, both of Ohio

[73] Assignee: Channel Products, Inc., Chesterland, Ohio

[21] Appl. No.: 672,227

[22] Filed: Jul. 21, 1988

[51] Int. Cl.$^4$ .............................................. F23Q 7/06
[52] U.S. Cl. .................................. 431/263; 431/264; 126/39 E; 126/41 R
[58] Field of Search ............. 431/263, 264; 126/41 R, 126/39 E; 313/143

[56] References Cited

U.S. PATENT DOCUMENTS 1,740,512 12/1929 Hoffman .......................... 126/39 E
4,288,210 9/1981 Leonard et al. ............... 126/41 R X
4,626,196 12/1986 Stohrer, Jr. .................... 126/39 E X

*Primary Examiner*—Randall L. Green
*Attorney, Agent, or Firm*—James A. Hudak

[57] ABSTRACT

A gas collector electrode assembly that can be easily assembled and/or disassembled is disclosed. The bottom wall of the gas collector includes two apertures connected by an elongated slot. The first aperture is sized to receive the end of the spark electrode assembly and the second aperture is sized to grippingly engage a circumferential groove on the spark electrode assembly adjacent its end. A tab portion is provided in the bottom wall of the gas collector adjacent the second aperture therein. By inserting the end of the spark electrode assembly into the first aperture and then by depressing the tab portion while laterally moving the spark electrode assembly into the second aperture, the tab portion can then spring back to its original position and grippingly engage the spark electrode assembly firmly attaching same to the gas collector. Disassembly of the spark electrode assembly from the gas collector is accomplished by depressing the tab portion and by laterally moving the spark electrode assembly from the second aperture into the first aperture permitting its withdrawal from the gas collector.

18 Claims, 3 Drawing Sheets

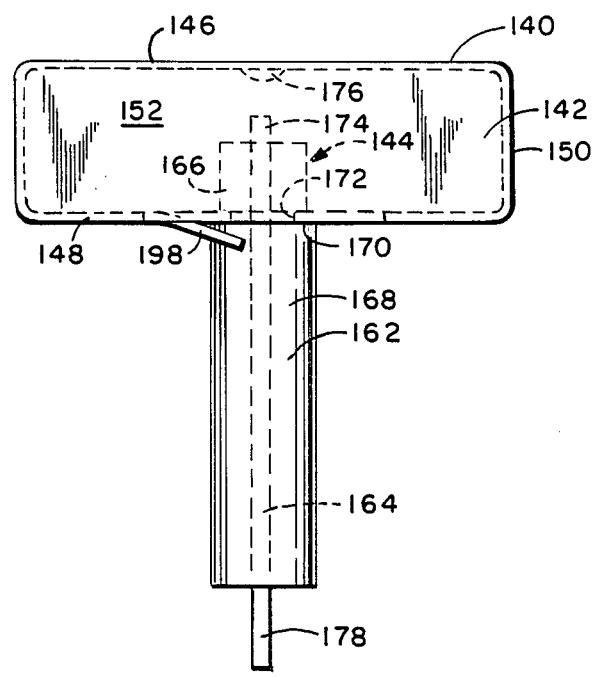

GAS COLLECTOR ELECTRODE ASSEMBLY FOR GAS BURNERS

TECHNICAL FIELD

The present invention relates generally to gas collector electrode assemblies for gas grills and more particularly to a gas collector electrode assembly that can be easily assembled and/or disassembled by the end user to permit the cleaning of same.

BACKGROUND ART

Gas grills typically use propane or natural gas as fuel and generally employ an ignition device in order to ignite same. Such an ignition device may include a gas collector electrode assembly and a manually operated piezoelectric transducer which acts as a spark generator. The manually operated piezoelectric transducer is electrically connected to the gas collector electrode assembly and provides the spark which is required to ignite the fuel-air mixture within the gas collector.

Gas collectors have many configurations, depending upon their application, and have an electrode assembly attached thereto and positioned therein so that the tip of the electrode and the top of the gas collector form a spark gap. The electrode is typically retained within a sleeve of ceramic material which acts as an insulator between the electrode and the metallic collector. The sleeve of ceramic material is typically attached to the gas collector by one or more retaining rings. Since retaining rings are utilized, the disassembly of the ceramic sleeve from the gas collector is a relatively difficult task, thus preventing the cleaning of the gas collector electrode assembly by the end user. In addition, since one or more retaining rings are typically utilized to attach the sleeve of ceramic material to the gas collector, assembly costs are relatively high. This type of assembly is almost always done in the factory because of the difficulty that would be encountered with assembly by the purchaser of the gas grill. In addition, after the sleeve of ceramic material has been attached to the gas collector there is always the possibility of breaking the ceramic sleeve during shipping since it is difficult to protect same when in the assembled state.

Because of the foregoing, it has become desirable to develop a simple, inexpensive structure for the gas collector and the electrode which permits same to be readily assembled and/or disassembled by the end user.

SUMMARY OF THE INVENTION

The present invention solves the problems associated with the prior art gas collector electrode assemblies and other problems by providing a gas collector having an unique design. The gas collector of the present invention includes two apertures connected by an elongated slot in its bottom wall. A first aperture is sized so as to receive the end of the sleeve of ceramic material which surrounds the electrode. A second aperture is sized to grippingly engage a circumferential groove on the sleeve. A tab portion is provided in the bottom wall adjacent the latter aperture and is bent slightly downwardly with respect to the bottom wall. By inserting the end of the sleeve of ceramic material into the first aperture and then by depressing the tab portion while laterally moving the sleeve into the second aperture, the tab portion can then spring back to its original position and grippingly engage the ceramic sleeve firmly attaching the sleeve to the gas collector. Disassembly of the sleeve of ceramic material from the gas collector is easily accomplished by depressing the tab portion slightly and by laterally moving the ceramic sleeve from the second aperture into the first aperture permitting the withdrawal of same from the gas collector. Thus, no retaining rings are utilized in order to attach the sleeve of ceramic material to the gas collector.

BRIEF DESCRIPTION OF THE DRAWINGS

FIG. 6 is a rear view of the present invention illustrating the tab portion grippingly engaging the spark electrode assembly.

DESCRIPTION OF THE PREFERRED EMBODIMENT

Figures 1, 2, 3:
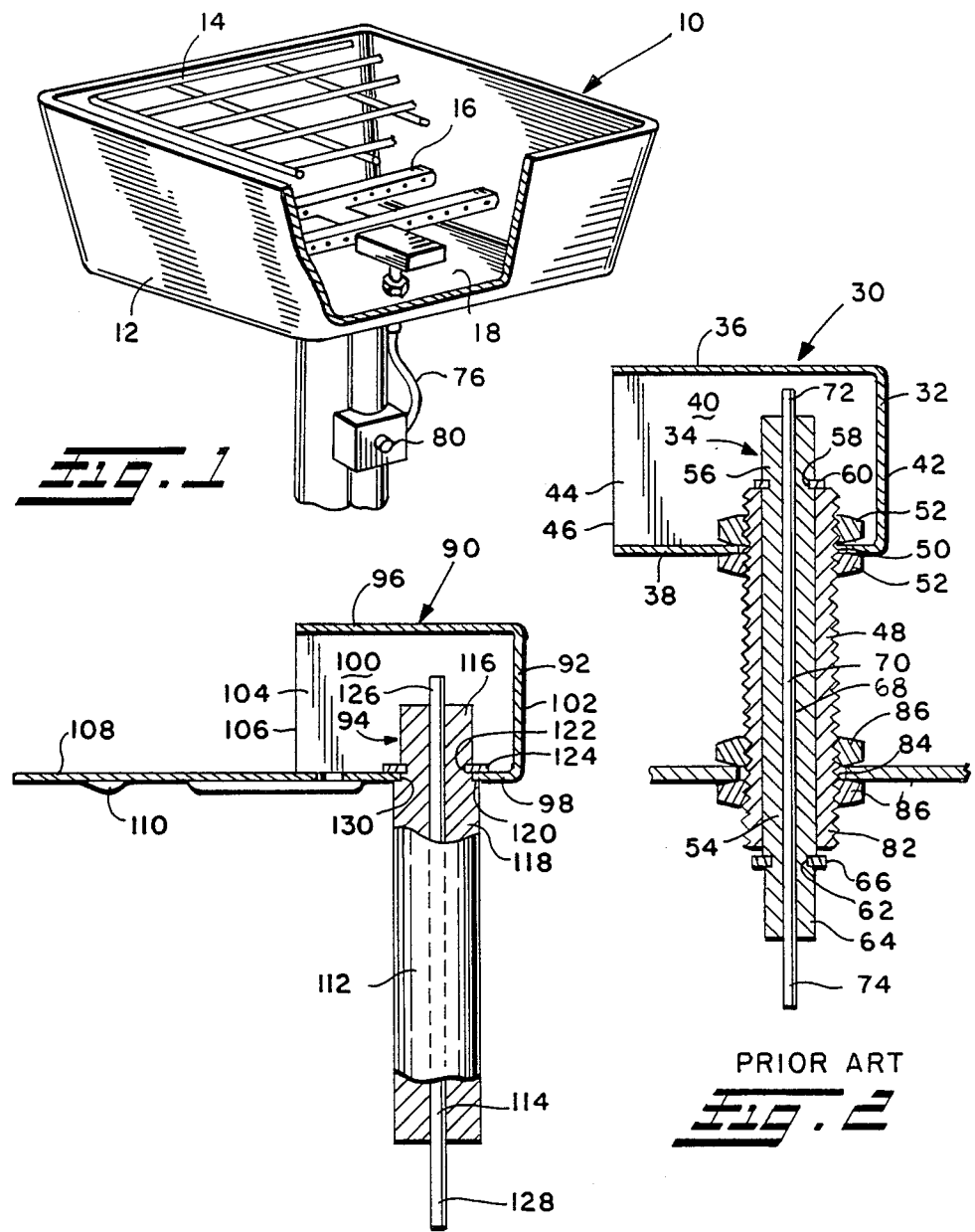
FIG. 1 is a partial perspective view of a gas grill illustrating a gas collector electrode assembly installed therein.
FIG. 2 is a side view, in cross-section, of a prior art gas collector electrode assembly.
FIG. 3 is a side view, in cross-section, of another prior art gas collector electrode assembly.

Referring now to the drawings where the illustrations are for the purpose of describing the preferred embodiment of the present invention and are not intended to limit the invention hereto, FIG. 1 is a partial perspective view of a gas grill 10. The gas grill 10 includes a bottom housing 12 to which a hinged lid (not shown) is normally attached in a known manner. A food support rack 14 is mounted on the housing 12 above a layer of rock or briquettes beneath which a gas burner 16 is positioned to heat same. The gas burner 16 is mounted adjacent the bottom wall 18 of the housing 12 and is supplied with gas from a supply conduit (not shown) extending through a hollow vertical post which supports the housing 12 and the burner 16. A selectively operable control valve is provided for controlling the flow of gas to the burner 16.

A prior art gas collector electrode assembly 30, shown in FIG. 2, acts as a spark ignitor for igniting gas flowing from the burner 16, and is comprised of a gas collector 32 and an electrode assembly 34 received within the gas collector 32. The gas collector 32 is formed from sheet metal and has a top wall 36, a bottom wall 38, opposite side walls 40 connecting the top wall 36 and the bottom wall 38, and a back wall 42 connecting the rear edge of the top wall 36 to the rear edge of the bottom wall 38. The spaced apart top wall 36, bottom wall 38, side walls 40 and back wall 42 define a gas collector chamber 44 having a front inlet opening 46 positioned adjacent the gas ports of the burner 16 for receiving gas and allowing the gas to flow into the chamber 44.

Mounting means for adjustably mounting the gas collector electrode assembly 30 to the bottom wall 18 of the housing 12 includes an elongated tube 48 in the form of an externally threaded pipe. An aperture 50 is provided in the bottom wall 38 of the gas collector 32 to receive an end of the tube 48. A pair of nuts 52 are threaded onto the tube 48 so as to be on opposite sides of the bottom wall 38 of the gas collector 32 to securely hold an end of the tube 48 thereto. A sleeve 54 of ceramic material or other suitable high temperature resistant electrical insulating material is received through the tube 48. An end 56 of the sleeve 54 extends through the aperture 50 in the bottom wall 38 of the gas collector 32 so as to be within the gas collector chamber 44. A circumferential groove 58 is provided adjacent the end 56 of the sleeve 54 and a retaining ring 60 is received therein. A similar circumferential groove 62 is provided in the opposite end 64 of the sleeve 54 and a retaining ring 66 is received therein. The retaining rings 60 and 66 prevent relative axial movement between the sleeve 54 and the tube 48 after assembly. The sleeve 54 of ceramic material has a central bore 68 therethrough to receive an elongated metallic electrode 70. Typically, the tip 72 of the electrode 70 adjacent the end 56 of the sleeve 54 is somewhat flattened or enlarged. The opposite end 74 of the electrode 70 is similarly flattened in order to receive an electrical connector (not shown) thereon.

An electrical conductor 76 sheathed in a high temperature resistant electrical insulating material is attached to the end 74 of the electrode 70 by an electrical connector. The conductor 76 is attached to an electromechanical transducer, such as a piezoelectric transducer, having a manually operable push button 80. Actuation of the manually operable push button 80 causes the transducer to apply a voltage pulse to the electrode 70. Since the gap between the tip 72 of the electrode 70 and the inner surface the top wall 36 of the gas collector 32 defines a spark gap, the application of a voltage pulse to the electrode 70 causes a spark to "jump" across the gap. The foregoing spark ignites the combustible mixture within the gas collector chamber 44.

The size of the spark gap between the tip 72 of the electrode 70 and the inner surface of the top wall 36 of the gas collector 32 can be adjusted by means of selective rotation of the pair of nuts 52 on the tube 48. The end 82 of the tube 48 is received through an aperture 84 in the bottom wall 18 of the grill housing 12 and is attached thereto by means of a pair of nuts 86 on opposite sides of the bottom wall 18 of the housing 12. Selective rotation of the nuts 86 allows for vertical adjustment of the gas collector electrode assembly 30 for positioning its front inlet opening 46 at a proper location relative to the gas ports of the burner 16.

From the foregoing, it is apparent that this prior art gas collector electrode assembly 30 is a relatively expensive device to produce inasmuch as it is comprised of numerous elements which require factory assembly. In addition, since the spark gap can be adjusted by selective rotation the pair of nuts 52 on the tube 48, the end user can adjust same which is undesirable since the spark gap should be fixed to insure proper operation of the gas collector electrode assembly. An improper spark gap can result in the non-ignition of the gas emanating from the ports in the burner 16. In addition, since retaining rings 60 and 66 are used to maintain the sleeve 54 of ceramic material within the tube 48, fixturing is required to insert the rings in circumferential grooves 58 and 62, respectively. Placement of the tube 48 and the sleeve 54 within such fixturing for the insertion of these rings is a time consuming operation. Because such retaining rings are used, it is extremely difficult to remove same so that the sleeve 54 of ceramic material can be removed from the tube 48 for cleaning purposes. Thus, cleaning of this gas collector electrode assembly 30 is extremely difficult to accomplish.

FIG. 3 illustrates another prior art gas collector electrode assembly 90 comprised of a gas collector 92 and an electrode assembly 94. The gas collector 92 is formed from sheet metal and includes a top wall 96, a bottom wall 98, opposite side walls 100 connecting the top wall 96 and the bottom wall 98, and a back wall 102 connecting the rear edge of the top wall 96 to the rear edge of the bottom wall 98. The spaced apart top wall 96, bottom wall 98, opposite side walls 100 and back wall 102 define a gas collector chamber 104 having a front inlet opening 106 positioned adjacent the gas ports of the burner 16 in order to receive gas and allow the gas to flow into the chamber 104. The bottom wall 98 of the gas collector 92 has an extension in the form of a flange 108 protruding outwardly therefrom. The flange 108 has a plurality of downwardly directed dimples 110 adjacent its end which are utilized for positioning and securing the gas collector electrode assembly 90 against the bottom wall 18 of the gas grill 10.

A sleeve 112 of ceramic or other suitable high temperature resistant electrical insulating material is provided with a metallic electrode 114 passing therethrough. The sleeve 112 is comprised of a first diameter portion 116 and a second larger diameter portion 118 with a circumferential shoulder 120 at their juncture. A circumferential groove 122 is provided in the first diameter portion 116 adjacent to the circumferential shoulder 120 but spaced apart therefrom. The width of the circumferential groove 122 approximates the thickness of a retaining ring 124 which is received therein. The width of the first diameter portion 116 of the sleeve 112 between the retaining ring 124 and the circumferential shoulder 120 approximates the thickness of the bottom wall 98 of the gas collector 92. The end of the electrode 114 adjacent the end of the sleeve 112 containing the circumferential groove 122 is flattened or enlarged to form an electrode tip 126. The opposite end 128 of the electrode 1145 is flattened for connection to an electrical conductor (not shown) which supplies voltage pulses to the electrode 114 for ignition of the gas within the gas collector chamber. In order to assemble the gas collector electrode assembly 90, the first diameter portion 116 of the sleeve 112 is inserted through an aperture 130 provided in the bottom wall 98 of the gas collector 92 until the circumferential shoulder 120 engages the outer surface of the bottom wall 98. After such engagement has been made, the retaining ring 124 is received in the circumferential groove 122. In this manner, the top and bottom surfaces of the bottom wall 98 of the gas collector 92 are contacted by the retaining ring 124 and the circumferential shoulder 120 respectively, attaching the sleeve 112 to the gas collector 92.

It has been found that the foregoing prior art gas collector electrode assembly 90 has a number of inherent disadvantages. For example, the placement of the retaining ring 124 within the circumferential groove 122 requires fixturing to accomplish same. Placement in such fixturing is a relatively expensive assembly operation. In addition, since a retaining ring is utilized to secure the gas collector 92 to the sleeve 112, disassembly of same for cleaning purposes is difficult. Lastly, because of the use of the retaining ring and the fixturing required to attach the gas collector 92 to the sleeve 112, the gas collector and the sleeve are typically shipped to the end user as a complete assembly. Such shipment results in the sleeve of ceramic material being in an unprotected state resulting in breakage of same. Such breakage could be greatly alleviated or eliminated if the sleeve of ceramic material could be shipped separately from the gas collector, but such shipment would require the end user to attach the sleeve to the gas collector. Such assembly would be difficult because of the use of the retaining ring to attach the foregoing elements.

Figure 4:
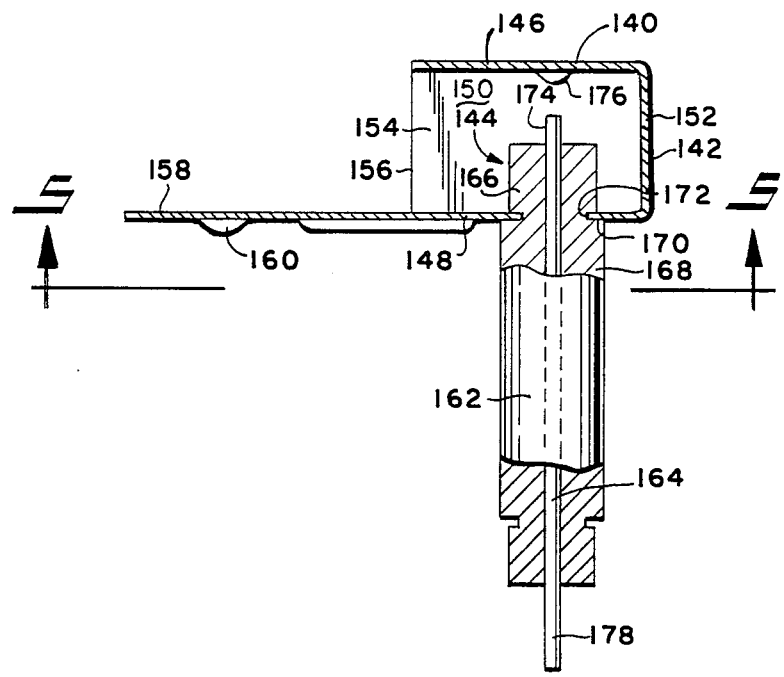
FIG. 4 is a side view, in cross-section, of the present invention.

Referring now to FIG. 4, a gas collector electrode assembly 140 of the present invention is illustrated. The gas collector electrode assembly 140 is comprised of a gas collector 142 and an electrode assembly 144. The gas collector 142 is similar to gas collector 92 in that it is formed from sheet metal and includes a top wall 146, a bottom wall 148, opposite side walls 150 connecting the top wall 146 and the bottom wall 148, and a back wall 152 connecting the rear edge of the top wall 146 to the rear edge of the bottom wall 148. The spaced apart top wall 146, bottom wall 148, opposite side walls 150 and back wall 152 define a gas collector chamber 154 having a front inlet opening 156 positioned adjacent the gas ports of the burner 16 in order to receive gas and allow gas to flow into the chamber 154. It should be noted that one or both of the side walls 150, or a portion thereof, can be omitted, if required. The bottom wall 148 of the gas collector 142 has an extension in the form of a flange 158 protruding outwardly therefrom. The flange 158 has a plurality of downwardly directed dimples 160 adjacent its end which are utilized for positioning and securing the gas collector 142 against the bottom wall 18 of the gas grill 10.

A sleeve 162 of ceramic or other suitable high temperature resistant electrical insulting material is provided with a metallic electrode 164 passing therethrough. The sleeve 162 is comprised of a first diameter portion 166 and a second larger diameter portion 168 with a circumferential shoulder 170 at their juncture. A circumferential groove 172 is provided adjacent the circumferential shoulder 170. The width of the circumferential groove 172 approximates the thickness of the bottom wall 148 of the gas collector 142. The end of the electrode 164 adjacent the end of the sleeve 162 containing the circumferential groove 172 is flattened or enlarged to form an electrode tip 174. An inwardly directed dimple 176 is provided in the top wall 146 of the gas collector 140 and is positioned so as to be opposite electrode tip 174 forming a spark gap therebetween. The opposite end 178 of the electrode 164 is flattened to receive an electrical conductor (not shown) which supplies voltage pulses to the electrode 164 for ignition of the gas within the gas collector chamber 154.

Figure 5:
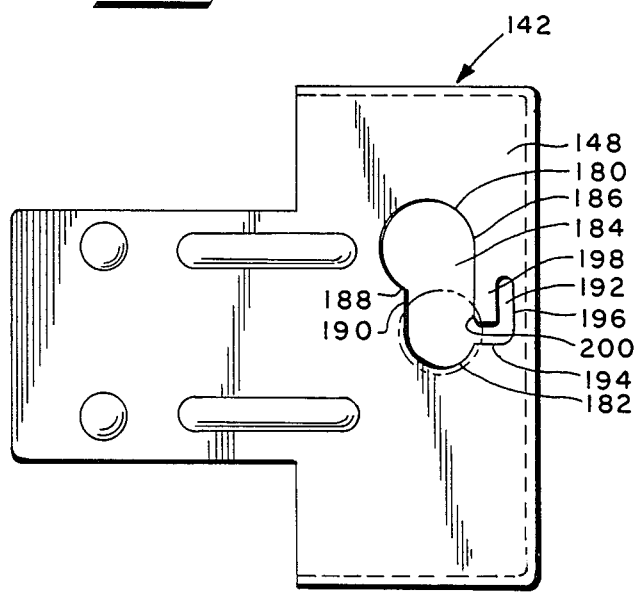
FIG. 5 is a bottom view of the present invention illustrating the apertures therein, the elongated slot between the apertures, and the locking tab in the bottom wall thereof.

From the foregoing, it is apparent that the overall configuration of the gas collector 142 is similar to that of the gas collector 92, however, the method for attaching the sleeve 162 to the gas collector 142 is significantly different. Referring now to FIG. 5, an enlarged view of the bottom wall 148 of the gas collector 142 is shown. The bottom wall 148 contains apertures 180 and 182 which are connected by a slot 184. The diameter of aperture 180 is approximately the same as the diameter of the first diameter portion 166 of the sleeve 162, whereas the diameter of the aperture 182 is approximately the same as the root diameter of the circumferential groove 172 in the first diameter portion 166 of the sleeve 162. The centers of the apertures 180 and 182 are offset resulting in one edge 186 of the slot 184 being tangent to both apertures 180 and 182 and resulting in a corner 188 being formed on the opposite edge 190 of the slot 184. An L-shaped slot 192 is formed in the bottom wall 148 so that one portion 194 thereof is substantially perpendicular to edge 186 of slot 184 whereas the other portion 196 of the L-shaped slot 192 slot is substantially parallel to the edge 186 of the slot 184. The placement of the foregoing L-shaped slot 192 results in a tab 198 being formed between the edge 186 of the slot 184 and portion 196 of the L-shaped slot 192. This tab 198 is bent slightly outwardly from the bottom wall 148 of the gas collector 142. In order to attach the sleeve 162 of ceramic material to the gas collector 142, the first diameter portion 166 of the sleeve 162 is inserted through aperture 180 in the bottom wall 148 of the gas collector 142. The sleeve 162 is then pressed against the bottom wall 148 of the gas collector 142 so that circumferential shoulder 170 compresses the outwardly directed tab 198 on the bottom wall 148. While the foregoing compression is occurring, the sleeve 162 is moved laterally through slot 184 until circumferential groove 172 engages the surface of bottom wall 148 defining aperture 182. When such engagement occurs, the sleeve 162 is released causing an edge 200 on the tab 198 to engage the surface of the second diameter portion 168 of the sleeve 162. In this manner, engagement of the tab 198 with the second diameter portion 168 of the sleeve 162 results in firm attachment between the sleeve 162 and the gas collector 142.

In order to disassemble the sleeve 162 from the gas collector 142, while manually depressing the tab 198, the sleeve 162 is moved laterally through slot 184 until first diameter portion 166 is received within aperture 180 permitting its easy withdrawal from the gas collector 142. Thus, attachment and detachment of the sleeve 162 with the gas collector 142 is an extremely easy operation.

From the foregoing, it is apparent that the gas collector 142 offers a number of advantages over the prior art collectors. For example, the spark gap is set and cannot be changed by the end user. This ensures that the proper spark gap will always be maintained guaranteeing the ignition of the fuel from the burner. In addition, since retaining rings are not utilized for attaching the sleeve of ceramic material to the gas collector, fixturing is not required for the assembly or disassembly of same. Thus, assembly and disassembly of the sleeve of ceramic material with the gas collector is an extremely simple operation which can be performed by the end user. Because the foregoing is an extremely simple operation, the sleeve can be easily detached from the gas collector permitting the cleaning of same by the end user. Lastly, since retaining rings are not required to attach the sleeve of ceramic material to the gas collector, the gas collector and the sleeve can be shipped separately to the end user. In this manner, measures can be taken to protect the sleeve of ceramic material from breakage of same. After the sleeve and the gas collector have reached the end user, the end user can readily attach the sleeve to the gas collector by the method previously outlined. Thus, the present invention solves the previously stated problems associated with the prior art gas collector electrode assemblies.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. A gas collector for a spark electrode assembly utilized in gas burner applications comprising a housing having spaced apart walls defining a collector chamber, and means for grippingly engaging the spark electrode assembly so that a portion thereof is within said collector chamber, said engaging means being formed in one of said walls of said collector chamber and including a first aperture for receiving the spark electrode assembly and a tab portion with grippingly engages the spark electrode assembly.

2. The apparatus as defined in claim 1 wherein said tab portion is adjacent said first aperture.

3. The apparatus as defined in claim 1 wherein a portion of the surface defining said first aperture defines an edge of said tab portion.

4. The apparatus as defined in claim 1 wherein the plane defining said tab portion is angularly offset from the plane defining said wall of said collector chamber containing said engaging means.

5. The apparatus as defined in claim 1 wherein the diameter of said first aperture approximates the root diameter of a recess in the spark electrode assembly.

6. The apparatus as defined in claim 1 further including a second aperture provided in said wall of said collector chamber containing said engaging means and a slot interconnecting said first and said second apertures.

7. The apparatus as defined in claim 6 wherein the diameter of said second aperture is greater than the diameter of said first aperture.

8. The apparatus as defined in claim 6 wherein the diameter of said second aperture approximates the diameter of the spark electrode assembly.

9. The apparatus as defined in claim 6 wherein the placement of said first and second apertures in said wall of said collector chamber containing said engaging means and the placement of said slot connecting said first and second apertures permits the receipt of the spark electrode assembly within said second aperture and the movement of same through said slot into said first aperture.

10. A spark ignitor for a gas burner comprising a spark electrode assembly, a housing having spaced apart walls defining a collector chamber, and means for grippingly engaging said spark electrode assembly so that a portion thereof is within said collector chamber, said engaging means being formed in one of said walls of said collector chamber and including a first aperture for receiving the spark electrode assembly and a tab portion which grippingly engages the spark electrode assembly.

11. The apparatus as defined in claim 10 wherein said tab portion is adjacent said first aperture.

12. The apparatus as defined in claim 10 wherein a portion of the surface defining said first aperture defines an edge of said tab portion.

13. The apparatus as defined in claim 10 wherein the plane defining said tab portion is angularly offset from the plane defining said wall of said collector chamber containing said engaging means.

14. The apparatus as defined in claim 10 wherein the diameter of said first aperture approximates the root diameter of a recess in said spark electrode assembly.

15. The apparatus as defined in claim 10 further including a second aperture provided in said wall of said collector chamber containing said engaging means and a slot interconnecting said first and second apertures.

16. The apparatus as defined in claim 15 wherein the diameter of said second aperture is greater than the diameter of said first aperture.

17. The apparatus as defined in claim 15 wherein the diameter of said second aperture approximates the diameter of said spark electrode assembly.

18. The apparatus as defined in claim 15 wherein the placement of said first and second apertures in said wall of said collector chamber containing said engaging means and the placement of said slot connecting said first and second apertures permits the receipt of said spark electrode assembly within said second aperture and the movement of same through said slot into said first aperture.

* * * * *